United States Patent [19]

Lloyd

[11] Patent Number: 4,872,028

[45] Date of Patent: Oct. 3, 1989

[54] THERMAL-INK-JET PRINT SYSTEM WITH DROP DETECTOR FOR DRIVE PULSE OPTIMIZATION

[75] Inventor: William J. Lloyd, Belmont, Calif.

[73] Assignee: Hewlett-Packard Company, Palo Alto, Calif.

[21] Appl. No.: 170,518

[22] Filed: Mar. 21, 1988

[51] Int. Cl.[4] .......................... G01D 18/00; B41J 3/04

[52] U.S. Cl. ................................ 346/1.1; 346/140 R; 364/551.01; 364/571.04

[58] Field of Search .......................... 346/140, 1.1, 75; 364/551.01, 565, 571.02, 571.04, 571.05, 571.07

[56] References Cited

U.S. PATENT DOCUMENTS

| | | | |
|---|---|---|---|
| 4,417,256 | 11/1983 | Fillmore | 346/75 |
| 4,459,599 | 7/1984 | Ort | 346/140 |
| 4,496,954 | 1/1985 | Irwin | 346/75 X |
| 4,509,057 | 4/1985 | Sohl | 346/140 X |
| 4,590,482 | 5/1986 | Hay | 346/140 X |

OTHER PUBLICATIONS

Katen et al., An Inexpensive Portable Ink-Jet Family, H-P Journal, vol. 36, No. 5, May 1985, pp. 11-20.

*Primary Examiner*—Joseph W. Hartary

*Attorney, Agent, or Firm*—William H. F. Howard

[57] ABSTRACT

A thermal ink jet printing system includes a drop detector which is used in a feedback loop to optimize operational drive pulse parameters. By optimizing the drive pulse, drop velocity can be set within an optimal range above a inflection point in the transfer function of a print head drop generator. This provides near maximal drop velocity while minimizing heat dissipation at the heater resistors which would otherwise impair reliability and print head life. The drive circuitry includes a microcontroller including a pulse controller, a test generator and an algorithm function. During a maintenance procedure, for example, during start-up, the test generator causes the pulse controller to test each of many drop generators with a series of fixed-voltage rectangular pulses of digitally increasing pulse width. The pulse width at which a drop is first detected and the velocity of each drop detected is correlated with the width of the pulse which generated that drop. The algorithm function calculates an individual operational pulse width for each drop generator, or alternatively, a common operational pulse width for all drop generators, from the test data so collected. The pulse parameter value set so determined is programmed into the pulse controller and used during normal printing operation.

34 Claims, 2 Drawing Sheets

THERMAL-INK-JET PRINT SYSTEM WITH DROP DETECTOR FOR DRIVE PULSE OPTIMIZATION

BACKGROUND OF THE INVENTION

The present invention relates to ink jet printers and, more particularly, to a thermal ink jet printing system feedback from a drop detector to extend print head lifetimes.

Ink jet printers print by propelling ink to selected positions of a print medium, such as paper. The two major classes of ink jet printers are characterized as "drop-on-demand" and "continuous stream" respectively. Drop-on-demand ink jet printers eject ink only when ink is required for printing, whereas continuous stream ink jet printers propel ink in streams and deflect charged drops either to or away from a target medium. A thermal ink jet printer is a drop-on-demand printer which uses heat dissipated in a heater resistor to form and propel ink drops. In the other major type of drop-of-demand printers, e.g. piezo-electric ink jet printers, piezo electric deflection is used to create the pressure necessary to form and propel ink drops.

Although not generally used with thermal ink jet printers, drop detectors have been employed in control subsystems for ink jet printers. Electro-static, piezo-electric and optical drop detectors are known and have been used to determine the presence, speed and position of drops. Some continuous stream ink jet printers use feedback from drop detectors to optimize drop breakoff and charging. U.S. Pat. No. 4,509,057 to Sohl et al. discloses the use of feedback from an optical drop detector to minimize horizontal errors in drop position. Sohl et al. also teach that drop formation is optimized when drop velocity is maintained within a predetermined range. Drop velocity can be calculated from the duration between drop ejection and drop detection. Sohl et al. suggest using this teaching in combination with U.S. Pat. No. 4,459,599 to Donald L. Ort to adjust drive pulses so that drop velocity can be maintained within the velocity range required for optimal drop formation.

Heretofore, drop detectors have not been used to extend the lifetimes of thermal ink jet print heads. Generally, a thermal ink jet print head includes multiple drop generators, which can be used in parallel to increase printing throughput. Typically, each drop generator includes an ink chamber, a heater resistor and an orifice. When an electrical pulse of sufficient energy is applied to the heater resistor, the heat dissipated thereby vaporizes ink in the respective chamber. The volumetric expansion of the ink, resulting from vaporization, forces unevaporated ink through the respective orifice. Contraction of the vapor bubble contributes to breakoff of the ejected ink to form a drop which continues its path to the medium.

Given present day commercial requirements, each heater resistor is expected to deliver at least 40 million drops. Each of these drops corresponds to a rapid heating and cooling of the heater resistor, which is thus subject to considerable thermal fatigue. Thermal fatigue has been shown to aggravate a crack nucleation process, eroding the structural integrity of the heater resistor and its passivation. The effects of thermal fatigue are compounded with mechanical shock during vapor bubble collapse and corrosion from the hot ink liquid and vapor. These compounded effects must be without by a relatively thin heater resistor and its passivation. Failure of a single heater resistor can require replacement of the entire print head. Where the incorporating printer is not designed to use disposable print heads, failure of a single heater resistor means down time, repair costs and/or printer replacement costs.

The importance of limiting thermal fatigue in heater resistors is well recognized. Accordingly, considerable effort has been directed to design of the heater resistor itself, including its compositions and dimensions. In addition, the shape, duration and amplitude of drive pulses have been varied to determine optimal ranges. While some of these efforts have yielded positive results, thermal fatigue remains a limiting factor in thermal ink jet print head lifetimes. To supplement enhancements resulting from optimizing the heater resistor and drive pulse characteristics, as systems approach using feedback could be implemented. However, as explained below, the feedback systems used with continuous stream print heads and with piezo-electric print heads are not directed to minimizing thermal fatigue nor are they obviously adaptable to such a function. What is needed is a feedback system based upon parameters derived from an analysis of thermal ink jet print head operation to minimize thermal fatigue of heater resistors and enhance thermal ink jet print head lifetimes.

SUMMARY OF THE INVENTION

In accordance with the present invention, the drive pulse parameters for a thermal ink jet printer are adjusted so that the head operates within a thermally efficient range selected relative to a transfer function inflection point. The inflection point is located, either explicitly or implicitly, using feedback from a drop detector. The operating range is adjusted by controlling drive pulses to a heater resistor.

The transfer function used to select the operating range is characterized by an energy-related drive pulse parameter independent variable and a momentum-related drop parameter dependent variable. For example, the transfer function can relate drop speed to pulse width. Alternatively, the transfer function can relate drop volume (which correlates with drop mass, and thus drop momentum) with pulse amplitude. Generally, a transfer function is characterized by a pulse energy threshold point below which drop detection does not occur. Above this threshold point, drop velocity increases relatively rapidly with pulse energy. A typical transfer function includes an inflection point about which the rate at which velocity increases with pulse energy decreases significantly. This inflection point can be mathematically characterized and is generally apparent by visual inspection of a plot of the transfer function.

This inflection point can be used to determine an optimal operating range for a respective drop generator. Specifically, the drop generator should be operated at or slightly above its inflection point. It is undesirable to operate the drop generator below its inflection point because drop volume, drop speed, and hence drop trajectory, vary sensitively with pulse energy. Thus, below the inflection point, slight variations in pulse energy could impair print quality by diminishing control over drop placement. Furthermore, operation below the inflection point increases the risk that some drive pulses would fall below the threshold point and thus fail to eject required drops, seriously impairing print quality.

On the other hand, given a typical thermal ink jet print head transfer function, increasing drive pulse energy above that corresponding to the inflection point produces relatively diminished increases in drop speed. In fact, in some cases, drop speed can decrease as drive pulse energy is increased above some point above the inflection point. In either case, efficiency decreases above the inflection point so that an increasing percentage of drive pulse energy in converted to heat which does not contribute to print quality but does contribute to thermal fatigue.

One can conclude from this analysis that the ideal nominal operating point is within an appropriate range above the inflection point. At such a point, damage due to heat dissipation is minimized while drop ejection is assured. Some leeway above the inflection point maintains operation at or above the inflection point, for example, when drive pulse energies fall to the bottom of their expected range of variability.

Without necessarily recognizing the significance of transfer function inflection points, thermal ink jet print head manufactures typically operate significantly above an operating point though to be ideal to allow for tolerances in heater resistance values and power supplies. In the worst expected case of a power supply operating at the low end of its voltage tolerance and a heater resistor, along with the interconnecting circuitry, operating at the high end of its resistance tolerance, there is still enough pulse energy to form a bubble and provide the desired drop speed. As a consequence, most drop generators are supplied with significantly more than optimal pulse energy and so are operating at a temperature much higher than that desired. As a result, device life and thus reliability are adversely affected.

This analysis indicates that it is insufficient to use feedback reflecting drop speed alone to set an operating pulse energy to extend the lifetime of a thermal ink jet print head. The critical variable must be taken relative to an inflection point. Since the inflection point for a drop generator can vary over time, the feedback must permit explicit or implicit location of the inflection point. The art cited above discloses the use of drop detectors to measure drop speed and control pulse energy accordingly. However, the importance of a transfer function inflection point is not recognized so that an operating value cannot be precisely optimized for extending the lifetime of a thermal ink jet print head. Furthermore, the cited art does not teach using the detector feedback to track an inflection point, or any other reference point about which an optimal pulse-energy can be determined, so temporal changes in an inflection point cannot be accounted for.

The present invention utilizes a test generator to characterize the transfer function of a drop generator at multiple drive pulse energies so that the inflection point an be explicitly or implicitly determined. An inflection point can be explicitly determined by fitting a function to data points generated by the test generator and finding zeroes in the derivatives of the function. Drive pulse energies can then be set relative to the inflection point. An inflection point can be found implicitly by locating a secondary point, such as a drop ejection threshold point, with a predictable relationship to the inflection point. The operating point can then be set relative to this secondary point.

Whether an inflection point is found explicitly or implicitly, an algorithm function is provided to select an operating point for the drop generator which lies slightly above the inflection point. For example, one or more pulse parameters such as voltage amplitude and/or pulse width are selected to optimize print head performance and lifetime.

The present invention provides for individual feedback loops for each drop generator. This is advantageous in that variations between heater resistors in a print head are compensated for. However, some simplification is provided for in embodiments where a common optimal nominal operating point is set for all drop generators in a single print head. Due to the way some print heads are manufactured, heater resistor variations within a print head can be small compared to heater resistor variations between print heads. Thus, the common operating point approach compensates for power supply variations as well as the most substantial inter-resistor variations. Both the individual and common approaches can accommodate gradual changes in power supply and resistor values as pulse parameters can be adjusted routinely at printer start up and/or periodically during operation. These and other features and advantages of the present invention are apparent from the description below with reference to the following drawings.

DESCRIPTION OF THE PREFERRED EMBODIMENTS

Figure 1:
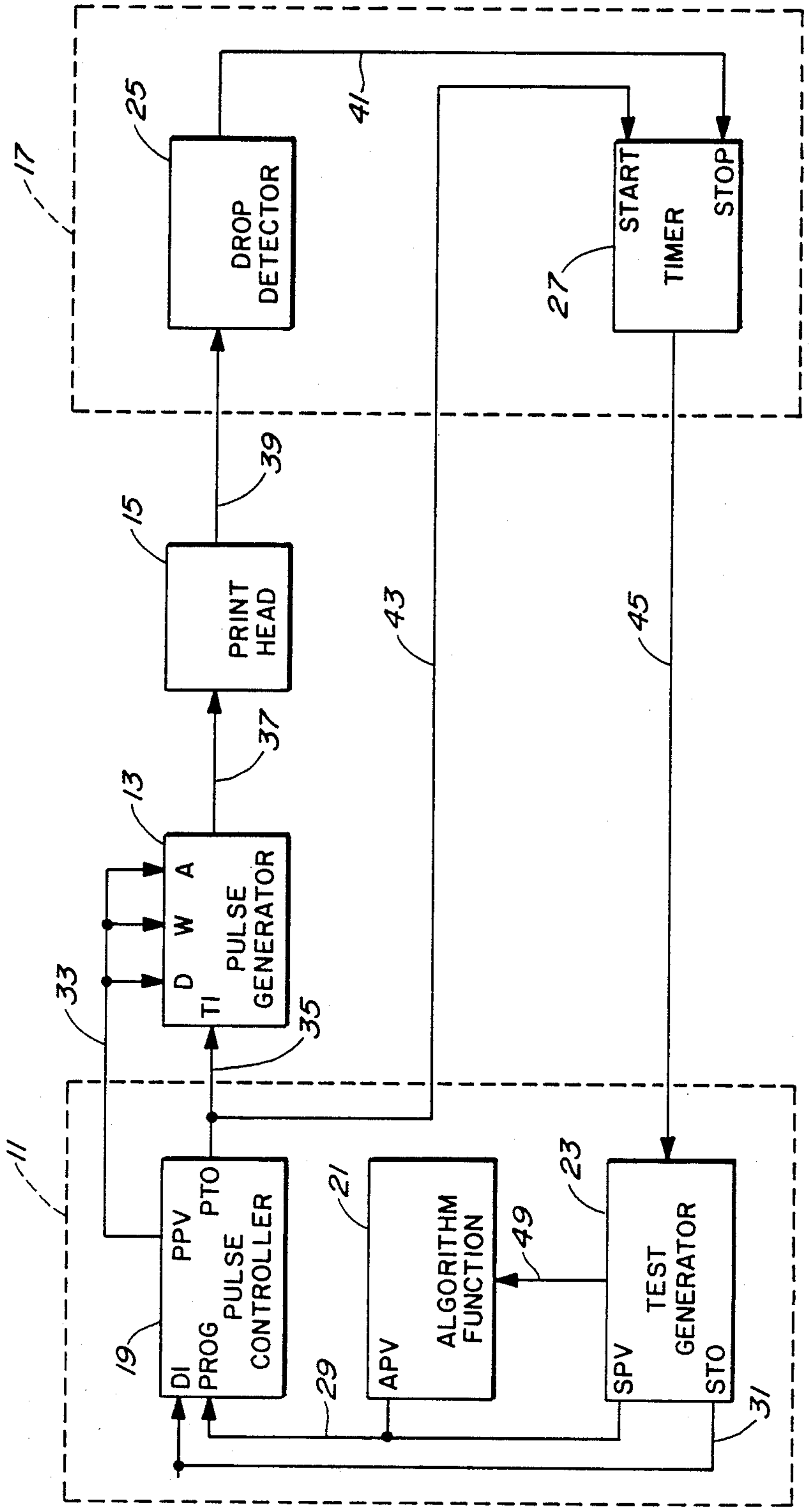
FIG. 1 is a block diagram of a printing system in accordance with the present invention.

As shown in FIG. 1, a printing system in accordance with the present invention comprises a microcontroller 11, a pulse generator 13, a print head 15 and a drop monitor 17. Microcontroller 11 includes a pulse controller 19, an algorithm function 21 and a test generator 23. Drop monitor 17 includes a drop detector 25 and a timer 27. Timer 27 is coupled to pulse controller 19 as well as to drop detector 25 so that the duration between pulse end and drop detection time can be measured. THe duration measured can be used to compute drop speed. Drop detector 25 is located within a maintenance station of the incorporating printer.

During printing, a carriage bearing print head 15 moves perpendicular to the direction of paper motion so that printing can take place over the width of a page being printed. Relative vertical movement is provided, for example by a sprocket or friction feed mechanism driving the paper. When the printing system is shut down, the carriage moves into a maintenance station to the side of the paper path. While the carriage is in the maintenance station, e.g., during shut down and start up, various procedures are activated to maintain reliable quality printing, for example, capping and wiping print head drop generators to prevent clogging and remove paper dust. In accordance with the present invention, this maintenance station, start-up routine optimizes print parameter values. In addition, the present invention provides for optimizing print parameter values at periodic times during printer use.

During start up and at regular intervals, test generator 23 supplies, from its program value output port SPV and along line 29, a series of parameter values to a program input port PROG of pulse controller 19, which transfers the values to pulse generator 13 while triggering one or more pulses per parameter value. Triggering information is transmitted from a trigger output port TO of test generator 23 via line 31 to a data input port DI of pulse controller 19.

Pulse controller 19 converts the program information it receives from test generator 23 into control signals which are transmitted from its pulse parameter value output port PPV along bus 33 to pulse delay D, pulse width W and pulse amplitude A input ports of the pulse generator. Trigger information is converted to trigger signals, which can be pulses to be amplified by driver circuitry in pulse generator 13. These trigger signals are transmitted from a pulse trigger output PTO of pulse controller 19 to a pulse trigger input TI of pulse generator 13 along pulse trigger line 35. The illustrated pulse generator 13 produces rectangular pulses whose energy is controlled by varying pulse width and/or pulse voltage amplitude. The pulses so generated are transmitted along drive pulse bus 37 to print head 15. In a pulse-width control mode, test generator 23 supplies a fixed pulse amplitude value while successively increasing pulse widths from a value below that expected to produce a detectable drop to a value above that expected to produce a detectable drop. In a pulse-voltage control mode, voltage is increased step-wise through a drop detection threshold. In either case, the transfer function for print head 15 and/or each of its drop generators can be characterized by correlating feedback from drop detector 25 with the parameter values set by test generator 23.

Test generator 23 provides the print head characterization to algorithm function 21. Algorithm function 21 derives a set of one or more parameter values with which pulse controller 19 is to be programmed during succeeding print operations. More specifically, algorithm function 21 applies an algorithm to test data from test generator 23 so that the print system operates within an optimal pulse-energy range.

Microcontroller 11 can be programmed to provide a variety of modes for test generator 23 and algorithm function 21. These modes can be categorized according to: (1) the parameter or parameters varied during calibration, by the output events used to calculate operational parameter values: (2) whether parameter values are set individually for each drop generator or whether parameter values are set individually for each drop generator or whether a single parameter value is collectively applied to all drop generators in the print head.

Figure 2:
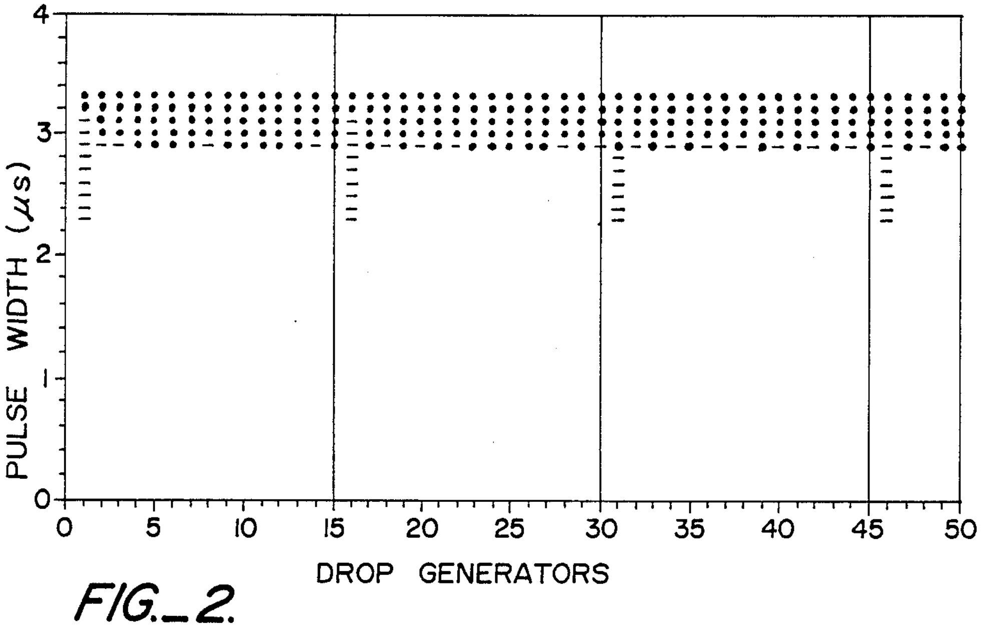
FIG. 2 is a graph illustrating a calibration strategy employed in the printing system of FIG. 1.

The graph of FIG. 2 represents a calibration procedure in which speed data is collected for all fifty drop generators of print head 15. A series of fixed-amplitude pulses with increasing pulse-widths are applied to the drop generators to characterize the transfer function for each drop generator. With a pulse rate of 1000 Hz and a voltage amplitude 13.0 volts, pulse width is increased in 0.1 μs increments from 2.3 μs to a predetermined point above the threshold, here 3.2 μs, at which drops have been detected from all drop generators. An upper threshold can be imposed to limit the test generator in the event a drop generator fails to function.

Referring to FIG. 2, only four drop generators are tested at the beginning pulse width of 2.3 μs. A hyphen ("-") is used to indicate the lack of a drop detection, while a dot ("·") denotes a drop detection. Once width at which that detection occurred is used a second time to test all fifty drop generators; this pulse width is 2.9 μs in FIG. 2. All fifty drop generators are then tested at each pulse width increment until the calibration procedure is completed.

Each time a drop is detected along drop trajectory 39, drop detector 25 transmits a signal to a stop input STOP of timer 27 along line 41. Drop detector 25 includes a piezo-electric membrane situated along the drop trajectory during the calibration procedure. When a drop hits the piezo-electric membrane a voltage pulse is induced across electrodes deposited onto the membrane. When this voltage pulse is transmitted to timer, it terminates a clocked counting sequence. Counting is begun when the pulse trigger signal is transmitted along line 43 from the pulse controller to a start input port START of timer 27. Activation of the START port indicates when the trailing edge of the drive pulse is applied to the heater resistor. Counting terminates on drop detection or on a time-out indicating no drop detection.

The final count is transmitted from timer 27 along line 45 to test generator 23. The duration indicated by the count can be used to calculate drop speed. This duration not only includes the transit time for the drop but also drop nucleation time and drop ejection time. Drop nucleation time and drop ejection time are typically small relative to transit times where a drop detector is placed in the range of 0.5 mm to 1.0 mm in front of an orifice plate and drop velocities are in the range of 2 meters per second (m/s) to 20 m/s. More accurate speed calculations can be made by subtracting nominal drop nucleation times and drop ejection times from durations used in calculating drop speed. In any event, systematic errors in speed calculations due to drop nucleation time and drop ejection time do not significantly impair determination of the inflection point or the setting of an operating drive-pulse energy relative to the inflection point.

Figure 3:
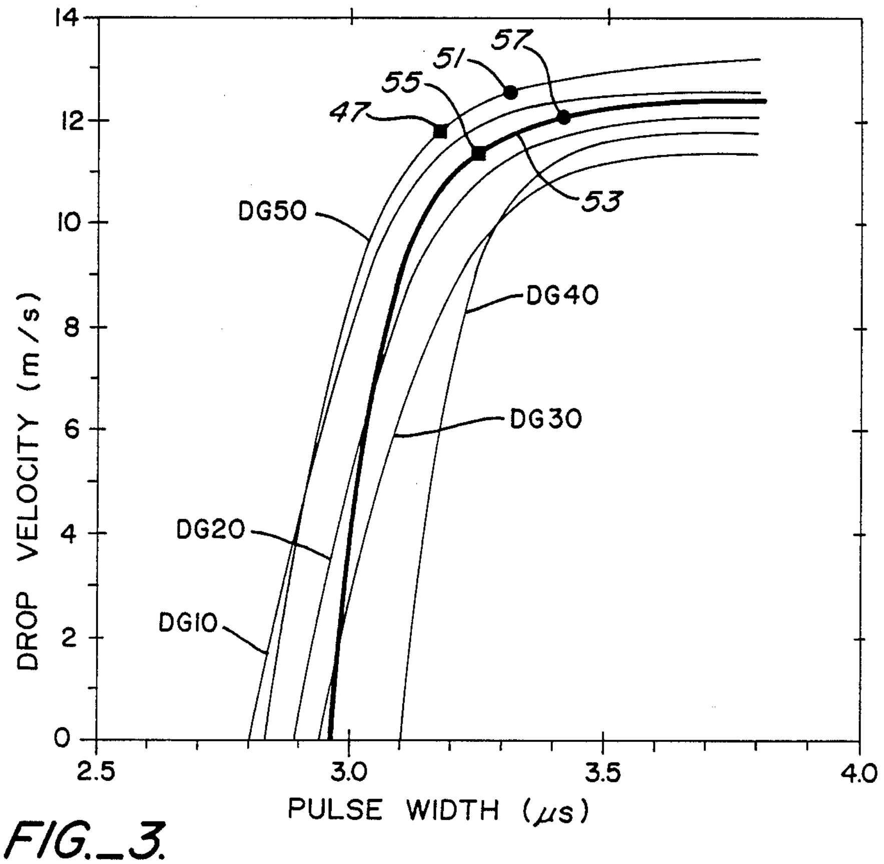
FIG. 3 is a graph of drop speed plotted against pulse width for five drop generators and an average across fifty drop generators in the printing system of FIG. 1.

Test generator 23 correlates calculated speeds with pulse widths to yield test data for drop generator characterizing its transfer function. Representative transfer functions are plotted for five of the fifty drop generators DG10, DG20, DG30, DG40 and DG50 in FIG. 3. Also indicated in FIG. 3 is inflection point 47 for drop generator DG50. The data of FIG. 3 was collected at a pulse rate of 1000 Hz using 13 V rectangular waves. The test data is transferred via path 49 to algorithm function 12 which applies known mathematical procedures to identify an inflection point for each drop generator. The algorithm function then sets an operational pulse width value of reach drop generator a predetermined percentage, e.g., 2%–5% above the respective inflection point. The operational pulse width value for drop generator DG50 is represented by operating point 51. A set of pulse parameter values, one for each drop generator, is transmitted from the algorithm pulse value output port APV along line 29 to the PROG input port of pulse controller 19. This set of pulse width values is then used by respective drop generators during subsequent printing operations.

In the foregoing preferred test mode, different operational pulsewidth values are set for each drop generator. It is simpler, and in many cases sufficient, to use the calibration procedure to set a single pulse width to be used in common by all drop generators. To this end, the test data can be combined to characterize an average drop generator 53, as shown in FIG. 3. A single inflection point 55 can be located and a common operational pulse width value, corresponding to common operating point 57, set a predetermined amount above the inflection point. Thus, the value set for a drop generator is a function of feedback from a set of drop generators rather than merely a function of its own characteristics. This approach allows power supply variations to be compensated for, while relying on relatively tight tolerances for resistor values within a given print head.

In addition to serving as a separate mode, this common mode approach can be used to supplement a mode in which drop generators are set individually. Where the test data for a drop generator does not permit reliable identification of an inflection point, the inflection point for an average drop generator can be used in setting the operational pulse width for that drop generator.

Pulse width is a preferred variable for controlling drive pulse energy since it can be set digitally using pulse-width modulation techniques, in contrast to pulse amplitude modulation, for example. Pulse width is also a convenient variable in that pulse energy for a rectangular pulse varies linearly with pulse width, while varying as the square of pulse amplitude. Thus, the graphs of FIG. 3 show transfer functions in the form of drop speed versus pulse-width for the drop generators indicated.

The advantages of pulse width as a variable notwithstanding, pulse amplitude is also a suitably variable pulse parameter. The test generator can vary pulse amplitude while holding pulse width constant. The corresponding graphs are similar to those of FIGS. 3 and 4, except that the horizontal axis is voltage rather than time. In addition, different pulse shapes and energy-related pulse parameters can be used in characterizing a print head. An "energy-related pulse parameter" is a parameter which, when varied, causes pulse energy to vary.

Operational pulse parameter values can be set without explicitly locating inflection points. Typically, the optimal operational pulse width for a constant amplitude rectangular pulse is in the range of 10% to 25% above the respective threshold value. Accordingly, testing need only identify a threshold value of interest. The algorithm function can then set an operational value of predetermined percentage above that. This approach can be applied individually or collectively and to a variety of pulse parameters.

For examples, the test data can be collected as indicated in FIG. 2, except that testing terminates when drops have been detected from all drop generators, e.g., at 3.2 μs pulse width. Velocities need not be calculated and so no timer need be used. Individual parameter values can be set a predetermined percentage above the values at which a drop was first detected from a respective drop generator. Alternatively, a common parameter value an be set from an average or other value statistically determined from the thresholds determined through testing.

Both color and black and white print heads are accommodated, as are single and multiple drop generators heads. These and other variations and modifications to the preferred embodiments are provided for by the present invention, the scope of which is limited only by the following claims.

What is claimed is:

1. A system comprising:

a thermal ink jet print head with at least one ink drop generator which generates and propels ink drops in response to electrical pulses, said ink drop generator having an electrical input for receiving said electrical pulses;

pulse generator for generating said electrical pulses and transmitting to said electrical input, each of said pulses having a durational width, said pulse generator being electrically coupled to said drop generator;

a drop detector for providing drop detection signals when said drops reach a predetermined distance from said drop generator;

monitor means for monitoring a drop velocity parameter, said monitor means being coupled to said pulse generator for determining pulse generation times and to said drop detector for receiving said drop detection signal;

a pulse width controller for determining the duration widths of respective ones of said electrical pulses; and program means for setting a programemd pulse width to be determined by said pulse width controller, said program means including test generator means for commanding said pulse width controller to vary the widths it determines for said electrical pulses so that a threshold width can be determined below which drop detections do not consistently occur in response to electrical pulses, said program means setting said pulse width as a function of said threshold width so that said pulse width is greater than said threshold width.

2. A system comprising:

a thermal ink jet print head with a print drop generator set having at least one print generator each print drop generator of said set having pulse input means for receiving an electrical pulse and drop output means through which ink can be propelled in response to said electrical pulse;

pulse generator means for generating electrical pulses, said pulse generator having pulse output means coupled to the pulse input of each print drop generator of said set, said pulse generator means having trigger input means for receiving trigger signals for triggering pulse generation and at least one pulse parameter input for receiving pulse parameter signals for determining at least one energy-related pulse parameter of a pulse generated by said pulse generator means;

pulse controller means for transmitting trigger signals and pulse parameter signals to said pulse generator means, said pulse controller means being coupled to said trigger input means and said pulse parameter input means of said pulse generator means, said pulse controller means having data input means for receiving data signals to be converted by said pulse controller means into a series of trigger signals and program input means for receiving and storing pulse parameter values;

drop monitor means for measuring a momentum-related drop parameter for drops propelled from said print drop generators set, said drop monitor means having monitor output means for transmitting momentumrelated measurements;

test generator means for characterizing each print drop generator of said set as a function of said momentum-related drop parameter versus said energy-related pulse parameter, said test generator means having test generator input means coupled to said monitor output means for receiving said momentum-related measurements, said test generator means having test generator output means coupled to said program input means of said pulse controller means for transmitting test generator outputs to vary generated pulses according to a predetermined energy-related parameter, said test generator means having test data output means for transmitting characterizing information as to said momentum-related measurements as a function of said test generator outputs; and algorithm means for determining an optimal value for said energyrelated related pulse parameter for each channel of said set, said algorithm means being coupled to said data output means of said test generator means for receiving said characterizing information therefrom, said algorithm means being coupled to said program input means of said pulse controller means for transmitting pulse parameter values thereto.

3. The system of claim 2 wherein said algorithm means calculates an optimal value based on a measured pulse parameter threshold below which no drops are detected by said monitor means for a given print drop generator.

4. The system of claim 2 wherein said algorithm means identifies an inflection point characterizing a print drop generator and sets an optimal value within a predetermined range above said inflection point.

5. The system of claim 2 wherein said all print drop generators of said set are assigned a common pulse parameter value at any given time.

6. The system of claim 2 wherein said algorithm means assigns an optimal value for each print drop generator of said set as a function of measurements made on it.

7. The system of claim 2 wherein said pulse parameter is pulse width.

8. The system of claim 2 wherein said pulse parameter is pulse voltage amplitude.

9. The system of claim 2 wherein said momentum-related drop parameter is time between pulse onset and drop detection.

10. The system of claim 2 wherein said momentum-related drop parameter is drop velocity.

11. The system of claim 2 wherein said momentum-related drop parameter is drop momentum.

12. The system of claim 2 wherein said drop monitor means includes a drop detector and a timer, said timer being coupled to one of said pulse controller and said pulse generator and to said drop detector so that it can measure the duration between a pulse and a resulting drop detection.

13. A system comprising:

transducer means for converting pulses characterizable by respective pulse energies and corresponding energy-related pulse parameter values into output events characterizable by respective output energies and a corresponding energy-related output parameter values, said transducer means being characterizable by an energy function of said output energies versus said pulse energies, said energy function being monotonically increasing over a predetermined pulse energy range, said energy function including an infection point within said predetermined pulse energy range, said transducer means being characterizable by a parameter function of said output parameter values versus said pulse parameter values;

said transducer means having a transducer input for receiving said pulses and a transducer output for outputting said output events;

pulse generator means for generating said pulses, said pulse generator having and output coupled to said transducer means and an input for receiving control signals;

pulse control means for controlling the pulse parameter value for each of said pulses, said pulses control means having a control output coupled to the control input of said pulse generator means;

monitor means for detecting output events and measuring said output parameter values to each detected output event, said monitor means having a detector coupled to said transducer output for receiving output events output thereby, said monitor means having a monitor output for transmitting said output parameter values;

test generator means for characterizing said parameter function at a number of different pulse parameter values to provide parameter function data, said test generator means being coupled to said pulse control means for selecting different pulse parameter values to characterize pulses generated by said pulse generator means, said test generator means being coupled to said monitor output so that the output parameter value measured for a given output event is identifiable with the pulse converted into the given output event so that pulse parameter values can be related to respective output parameter values; and algorithm means for determining an operating value for said pulse parameter by applying an algorithm to said parameter function data, said algorithm being selected to yield an operating value within a tolerance range of pulse parameter values corresponding to a pulse energy range lying above said inflection point.

14. The system of claim 13 wherein:

said transducer means is an ink jet print head which converts electrical pulses to ink drop production and movement;

said pulse generator generates electrical pulses; and said monitor means includes a drop detector.

15. The system of claim 14 wherein said ink jet print head is a thermal ink jet print head.

16. The system of claim 15 wherein said pulse parameter values are pulse widths.

17. The system of claim 15 wherein said pulse parameter values are pulse voltage amplitudes.

18. The system of claim 15 wherein said output parameter values are ink drop velocities.

19. The system of claim 15 wherein said thermal ink jet print head does not produce drops detectable by said drop detector in response to pulses characterized by pulse parameter values below a threshold, said algorithm means determining said operating value as a function of said threshold as approximated by the minimum pulse parameter value for which a drop is detected by said drop detector as determined by said test generator means.

20. The system of claim 15 wherein said algorithm means determines from said pulse parameter data an inflection pulse parameter value corresponding to said inflection point and sets said operating value a predetermined tolerance amount above said inflection pulse parameter value.

21. A system comprising:

a transducer set including at least one transducer means for converting pulses characterizable by respective pulse energies and corresponding energy-related pulse parameter values into output events characterizable by respective output energies and corresponding momentumrelated output parameter values, each transducer means of said transducer set being characterizable by an energy function of said output energies versus said pulse energies, said energy function being monotonically increasing over a predetermined pulse energy range, said energy function including an inflection point within said predetermined pulse energy range, each transducer means of said set being characterizable by a parameter function of said output parameter values versus said pulse parameter values;

each transducer means of said set having a transducer input for receiving said pulses and a transducer output for outputting said output events;

pulse generator means for generating said pulses, said pulse generator having an output coupled to the transducer input of each transducer means of said set and an input for receiving control signals;

pulse control means for controlling the pulse parameter value for each of said pulses, said pulse control means having a control output coupled to the control input of said pulse generator means;

monitor means for detecting output events and measuring said output parameter values to each detector output event, said monitor means having a detector coupled to the transducer output of each transducer means of said set for receiving output events output thereby, said monitor means having a monitor output for transmitting said output parameter values;

test generator means for characterizing the parameter function of each transducer means of said set at a number of different pulse parameter values to provide parameter function data, said test generator means being coupled to said pulse control means for selecting different pulse parameter values to characterize pulses generated by said pulse generator means, said test generator means being coupled to said monitor output so that the output parameter value measured for a given output event is identifiable with the pulse converted into the given output event so that pulse parameter values can be related to respective output parameter values; and algorithm means for determining for each transducer means of said set an operating value for said pulse parameter by applying an algorithm to said parameter function data, said algorithm being selected to yield an operating value within a tolerance range of pulse parameter values corresponding to a pulse energy range lying above said inflection point.

22. The system of claim 21 wherein:

each transducer means of said set is a heater resistor which converts electrical pulses to ink drop production and movement; and said pulse generator generates electrical pulses.

23. The system of claim 22 wherein said monitor means includes a drop detector.

24. The system of claim 23 wherein said pulse parameter values are pulse widths.

25. The system of claim 23 wherein said pulse parameter values are pulse voltage amplitudes.

26. The system of claim 23 wherein said output parameter values are ink drop velocities.

27. The system of claim 23 wherein each said heater resistor produces drops detectable by said drop detector only in response to pulses characterized by pulse parameter values above a respective threshold, said algorithm means determining for each said heater resistor the respective operating value as a function of the respective threshold as approximated by the respective minimum pulse parameter value for which a drop is detected by said drop detector as determined by said test generator means.

28. The system of claim 23 wherein said algorithm means determines from said pulse parameter data an inflection pulse parameter value corresponding to said inflection point and sets said operating value a predetermined tolerance amount above said inflection pulse parameter value.

29. A method for controlling the energy to a thermal ink jet drop generator having an input for receiving energy pulses and an output for ejecting ink drops, said drop generator being characterized by a transfer function of drop speed versus pulse energy, said transfer function having an inflection point, said method comprising:

providing a drop detector for providing drop detection data characterizing drops ejected by said drop generator;

providing to said drop generator a series of energy pulses each of said pulses being characterizable by a value of an energy-related parameter, said series being characterized by a range of values of said energy-related parameter;

generating test results by mapping drop detection data to pulse data, said pulse data including, for each drop detection, the value of the energyrelated pulse parameter of the pulse causing ejection of that drop; and calculating an operating value for said energy-related pulse parameter from said test results according to an algorithm selected so that said operating value is within a predetermined range above said inflection point of said transfer function for said drop generator.

30. The method of claim 29 wherein said series of pulses is characterized by a series of increasing values of said energy-related parameter, the first value of said series of increasing values being a predetermined base value selected to be below a threshold value of said energy-related parameter required to cause said drop generator to eject a drop detectable by said drop detector.

31. The method of claim 30 wherein said algorithm calculates said operating value from said threshold value as determined by said test results.

32. The method of claim 29 wherein said algorithm determines said inflection point based on said test results and selects said operating value above said inflection point so determined.

33. The method of claim 29 wherein said step of providing a series of energy pulses involves providing a series of energy pulses with increasing pulse width.

34. The method of claim 29 wherein said step of providing a series of energy pulses involves providing a series of energy pulses with increasing amplitude.

* * * * *